(12) United States Patent
Seger

(10) Patent No.: US 8,397,650 B2
(45) Date of Patent: *Mar. 19, 2013

(54) REINFORCED HOLLOW PANEL AND METHOD OF MAKING

(75) Inventor: Anthony C. Seger, Sidney, OH (US)

(73) Assignee: Tooling Technology, LLC, Ft. Loramie, OH (US)

( * ) Notice: Subject to any disclaimer, the term of this patent is extended or adjusted under 35 U.S.C. 154(b) by 403 days.

This patent is subject to a terminal disclaimer.

(21) Appl. No.: 12/657,378

(22) Filed: Jan. 20, 2010

(65) Prior Publication Data

US 2011/0174197 A1 Jul. 21, 2011

(51) Int. Cl.
*B65D 19/38* (2006.01)

(52) U.S. Cl. ..................... 108/57.27; 108/901

(58) Field of Classification Search .... 108/57.25–57.28, 108/901
See application file for complete search history.

(56) References Cited

U.S. PATENT DOCUMENTS

| | | | |
|---|---|---|---|
| 5,197,396 A | 3/1993 | Breezer et al. | |
| 5,391,251 A * | 2/1995 | Shuert | 156/292 |
| 5,413,052 A | 5/1995 | Breezer et al. | |
| 5,676,064 A | 10/1997 | Shuert | |
| 5,755,162 A * | 5/1998 | Knight et al. | 108/53.1 |
| 5,769,003 A * | 6/1998 | Rose et al. | 108/55.3 |
| 5,813,355 A * | 9/1998 | Brown et al. | 108/53.3 |
| 5,843,366 A | 12/1998 | Shuert | |
| 5,845,588 A | 12/1998 | Gronnevik | |
| 6,018,927 A * | 2/2000 | Major | 52/793.1 |
| 6,389,990 B1 | 5/2002 | Apps | |
| 6,749,418 B2 * | 6/2004 | Muirhead | 425/515 |
| 6,807,911 B2 | 10/2004 | Carson et al. | |
| 6,826,887 B2 * | 12/2004 | Skov | 52/793.1 |
| 6,840,181 B2 | 1/2005 | Smyers | |
| 6,962,115 B2 | 11/2005 | Markling et al. | |
| 6,976,437 B2 | 12/2005 | Fisch et al. | |
| 7,197,989 B2 | 4/2007 | Apps | |
| 2009/0183655 A1 * | 7/2009 | Ogburn | 108/57.25 |
| 2010/0058959 A1 * | 3/2010 | Endo | 108/57.25 |

* cited by examiner

*Primary Examiner* — Hanh V Tran
(74) *Attorney, Agent, or Firm* — Jacox, Meckstroth & Jenkins

(57) ABSTRACT

A hollow upper deck panel for a plastic pallet has a smooth solid top surface and is made by thermoforming heated upper and lower twin sheets of thermoplastics material. The lower sheet is vacuum-formed into a lower mold section to form parallel spaced inverted U-shaped elongated open ribs projecting upwardly and having top portions fused to the upper sheet. The upper sheet is vacuum-formed into an upper mold section which has extendable and retractable blades to form parallel spaced elongated closed double wall ribs projecting downwardly between the open ribs and have bottom portions fused to the lower sheet. The closed double wall ribs extend transversely or perpendicular to the open ribs, and the ribs reinforce the deck panel in all directions. Support structure for the upper deck panel is also formed of plastics material and defines spaces for receiving parallel spaced forks of a forklift truck.

3 Claims, 4 Drawing Sheets

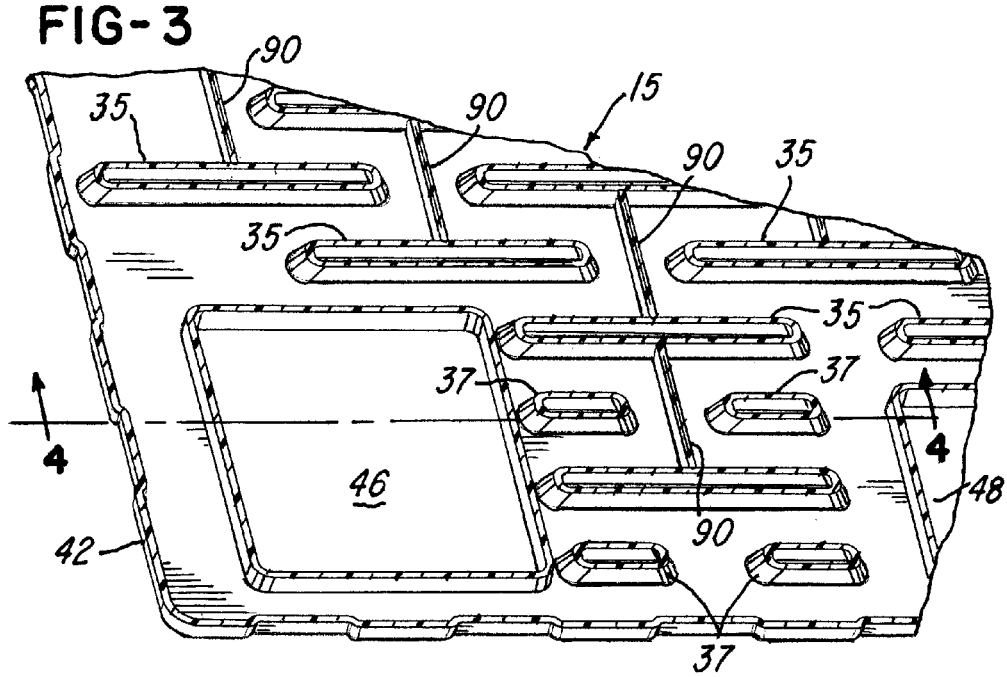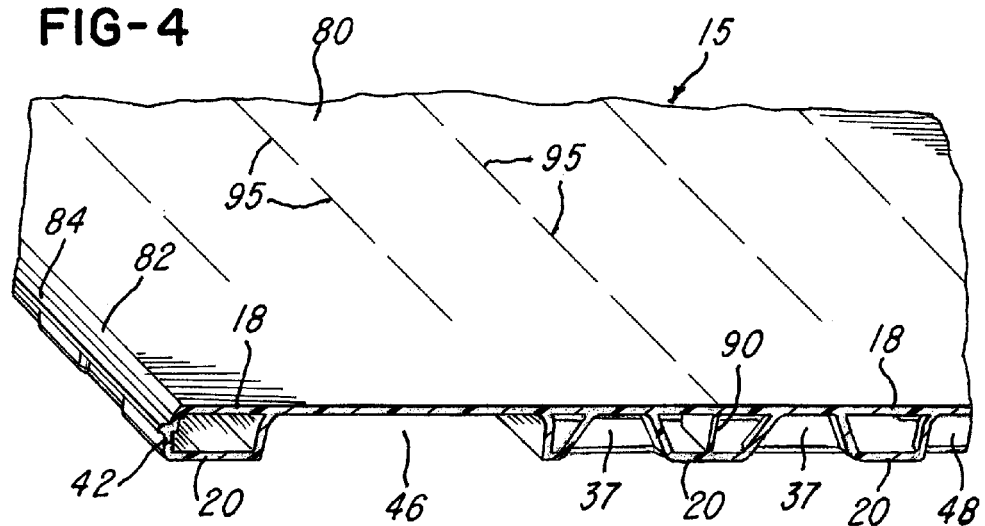

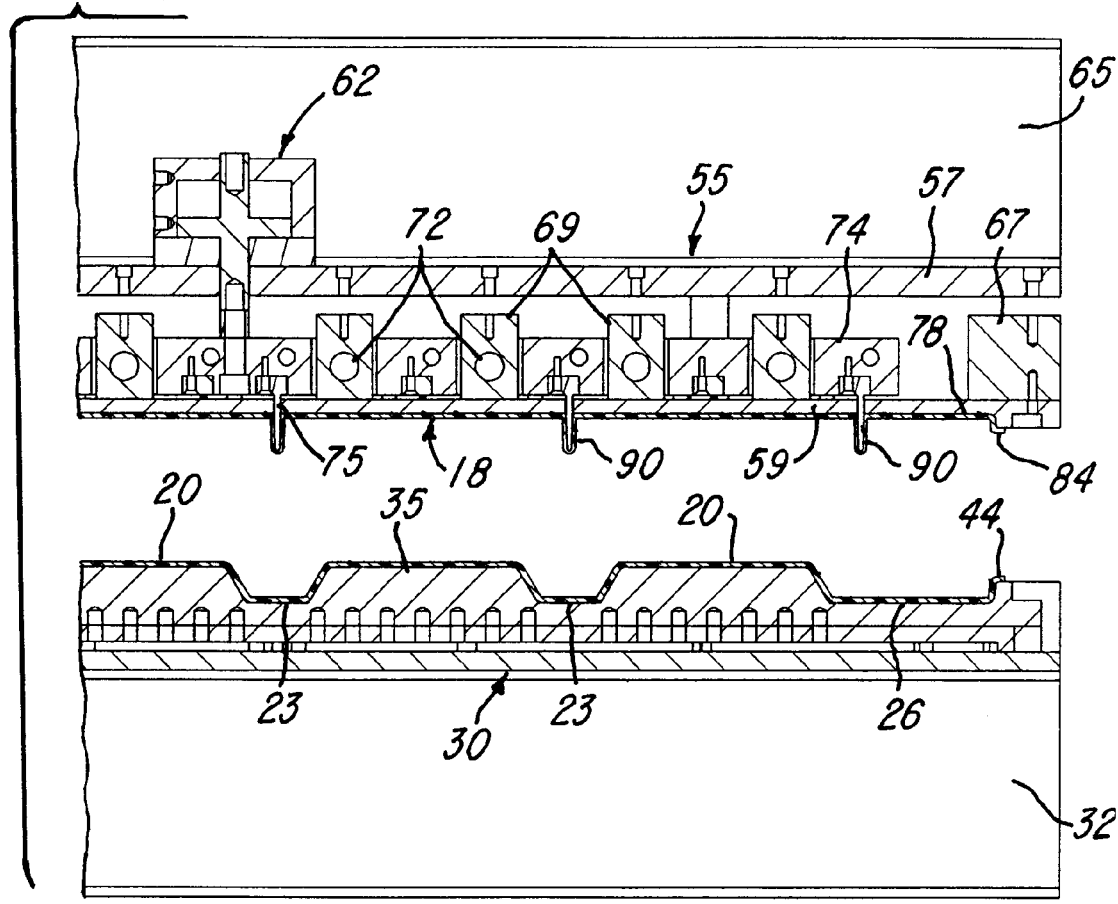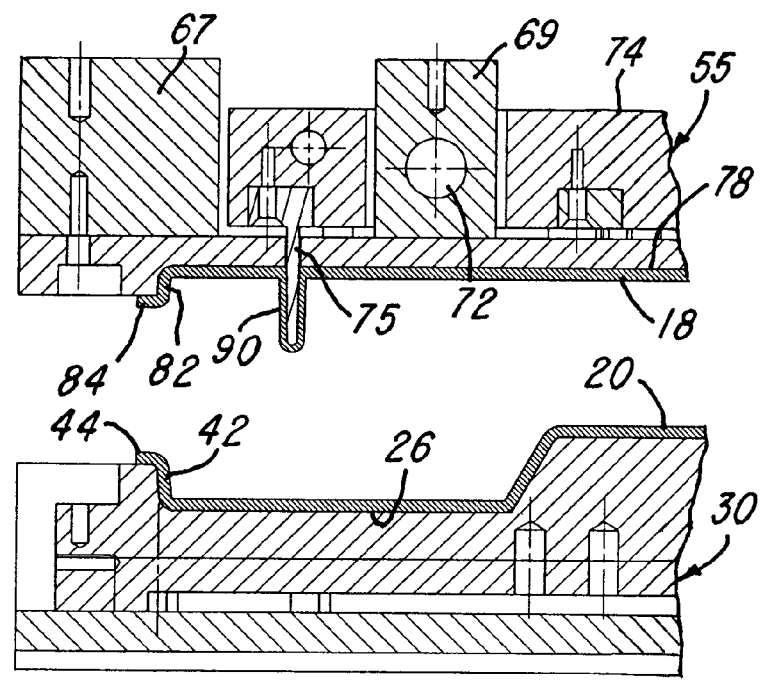

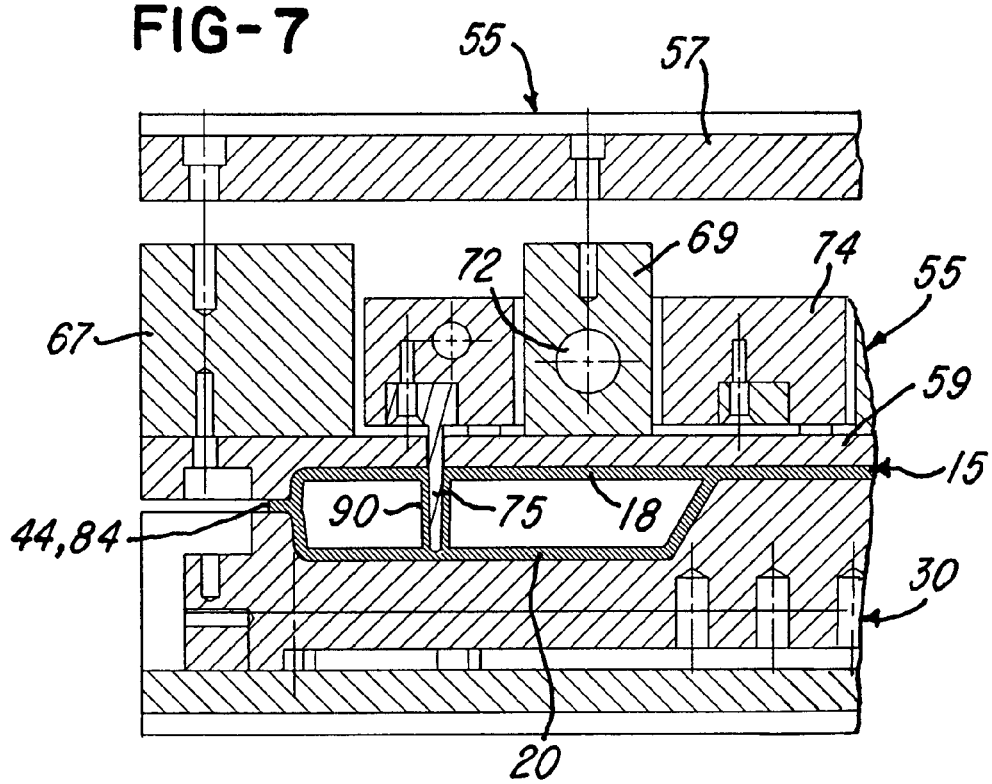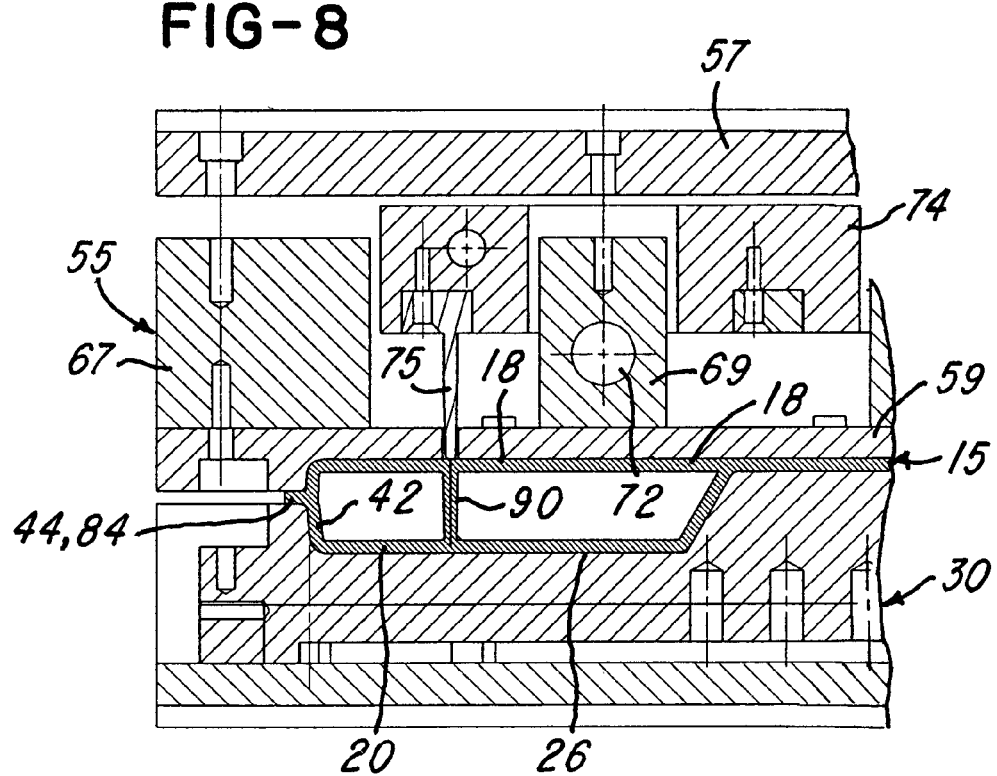

REINFORCED HOLLOW PANEL AND METHOD OF MAKING

BACKGROUND OF THE INVENTION

In the manufacture of large pallets of rigid plastics material and having recesses or spaces for receiving parallel spaced forks of a forklift truck, it is well known to form the pallets with a twin sheet thermoformed upper deck, for example, as disclosed in U.S. Pat. No. 5,197,396, No. 5,413,052, No. 5,676,064 and No. 5,813,355. It is also known to make or form upper decks and other components for a plastic pallet by extruding a plastic parison and directing the parison into blow molding equipment, for example, as disclosed in U.S. Pat. No. 5,845,588, No. 6,962,115 and No. 6,976,437. Blow-molding processes have also been used to form rigid hollow plastic panels, for example, as disclosed in U.S. Pat. No. 6,826,887. Plastic pallets have also been made by using injection molded components, for example, as disclosed in U.S. Pat. No. 6,389,990, No. 6,840,181 and No. 7,197,989. It is further known to make plastic pallets by rotational molding, for example, as disclosed in U.S. Pat. No. 6,807,911.

In the manufacture of any plastic pallet or hollow plastic panel, it is desirable to maximize the strength/weight ratio while minimizing the cost of manufacturing or producing the pallet or panel. Also, for many uses of a plastic pallet or panel, it is desirable for the top surface to be substantially smooth and solid without openings which can trap or collect undesirable debris or material. When the top deck and the bottom deck of a plastic pallet are vacuum-formed by a twin-sheet thermoforming process, it is also known to insert tubular metal reinforcing members between the sheets, for example, as disclosed in above mentioned U.S. Pat. No. 5,197,396 and No. 5,413,052. The top and bottom decks or panels of a plastic pallet formed by a twin-sheet or triple sheet thermoformed process are also commonly reinforced by vacuum-forming integral hollow or open ribs in the top and/or bottom sheets, for example, as disclosed in above U.S. Pat. No. 5,676,064, No. 5,813,355 and No. 6,749,418.

SUMMARY OF THE INVENTION

The present invention is directed to an improved twin-sheet thermoformed plastic panel incorporating integral rib reinforcement which significantly increases the strength of the panel and which also helps to minimize the thicknesses of the twin-sheets forming the panel. A panel constructed in accordance with the invention is ideally suited for use as the top deck of a plastic pallet in that the panel has a substantially solid top surface without any recesses or cavities which can collect dirt and debris.

In accordance with the illustrated embodiment of the invention, a reinforced hollow panel is produced by a twin-sheet thermoforming process wherein a lower thermoplastic sheet is vacuum-formed into a lower mold section to form parallel spaced inverted U-shaped elongated open ribs projecting upwardly and having spaced side walls. An upper sheet of thermoplastic material is vacuum-formed into an upper mold section which has a set of extendable and retractable parallel blades to form parallel spaced elongated closed double wall ribs projecting downwardly and having adjacent side walls. When the mold sections close on the heated sheets, top portions of the open ribs in the lower sheet fuse to the upper sheet, and the double walled closed ribs project downwardly between the open ribs and have bottom portions fused to the lower sheet. Air pressure is introduced between the fused together upper and lower sheets, before the sheets solidify, and the blades are retracted so that the adjacent walls of the double walled closed ribs fuse together. The closed double walled ribs extend transversely or perpendicular to the open ribs, and the end portions of the double walled ribs fuse to the side walls of the open ribs, with the result that the hollow plastic panel is reinforced in all directions. When the hollow plastic panel is used for the upper deck panel of a pallet, the supporting structure for the upper deck panel is also preferably formed of plastics material, and a lower deck panel may be formed in the same manner as the upper deck panel.

Other features and advantages of the invention will be apparent from the following description, the accompanying drawings and the appended claims.

BRIEF DESCRIPTION OF THE DRAWINGS

FIG. 3 is an enlarged perspective fragmentary section of a corner portion of the plastic panel shown in FIG. 2;

FIG. 4 is a fragmentary perspective section of the final twin-sheet thermoformed panel shown in FIG. 1 and taken generally on the line 4-4 of FIG. 3;

FIG. 5 is a fragmentary section of twin-sheet thermoforming tooling with the mold sections in an open position;

FIG. 6 is an enlarged fragmentary section of the tooling shown in FIG. 5;

FIG. 7 is a fragmentary vertical section of the tooling shown in FIGS. 5 & 6 with the mold sections in a closed position, with rib forming blades in an extended position; and FIG. 8 is a fragmentary section similar to FIG. 7 and showing the rib forming blades in a retracted position.

DESCRIPTION OF THE PREFERRED EMBODIMENT

Figure 1:
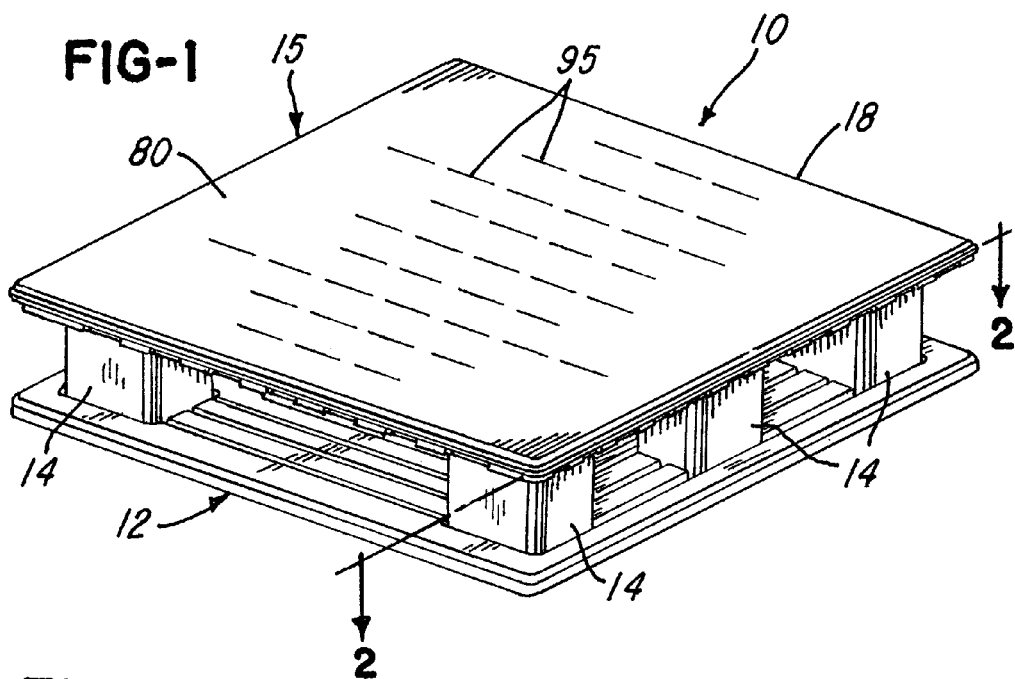
FIG. 1 is a perspective view of a plastic pallet having a reinforced hollow plastic panel constructed in accordance with the invention and forming the upper deck of the pallet.
Figure 2:
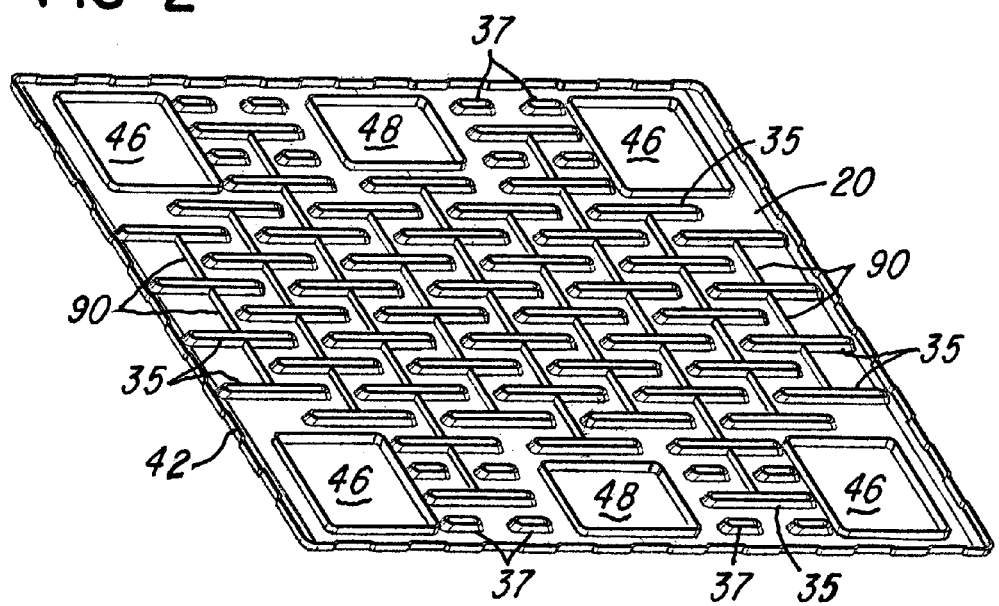
FIG. 2 is a perspective section of the hollow plastic panel, taken generally on the line 2-2 of FIG. 1.

FIG. 1 illustrates a plastic pallet 10 having a lower deck panel 12 connected by a set of peripherally spaced hollow legs 14 to a hollow plastic panel 15 constructed in accordance with the invention and forming the upper deck for the pallet 10. As shown in FIGS. 5-8, the hollow panel 15 is formed by twin-sheet thermoforming method and tooling as disclosed, for example, in U.S. Pat. No. 5,843,366, the disclosure of which is herein incorporated by reference. The hollow panel 15 is formed from an upper thermoplastic sheet 18 (FIG. 5) and a lower thermoplastic sheet 20 during the twin-sheet thermoforming operation. The heated lower sheet 20 is vacuum-formed into cavities 23 and 26 within a lower mold section 30 supported by parallel spaced I-beams 32. As shown in FIGS. 2 & 3, when the lower sheet 20 is vacuum-formed into the cavities 23 and 26 and other cavities within the lower mold section 30, elongated inverted U-shape bottom open ribs 35 and 37 are formed within the lower sheet along with a peripherally extending generally vertical wall 42 (FIG. 6) extending to a peripherally extending and outwardly projecting horizontal lip or flange 44.

The vacuum-forming of the lower sheet also forms a series of peripherally spaced open bottom cavities 46 and 48 (FIGS. 2-4) within the lower sheet 20, and the cavities receive the upper end portions of the legs 14 when the lower deck panel 12 is later assembled to the upper deck panel 15. The lower deck panel 12 is also vacuum-formed to have corresponding cavities 46 & 48 to receive the lower end portions of the legs 14 which are later attached or fused to the lower deck panel 12 and upper deck panel 15 during final assembly of the pallet.

Referring to FIG. 5, the twin-sheet thermoform tooling includes an upper mold section 55 having an upper mold plate 57 rigidly connected to a lower mold plate 59 with the upper mold plate 57 supporting a fluid cylinder 62. The upper mold plate 57 and lower mold plate are supported by parallel spaced I-beams 65 which are connected to a hydraulic cylinder (now shown) for vertical movement as a unit in a conventional manner. The lower mold plate 59 is also supported by a peripherally extending frame members 67 and parallel spaced members or rails 69 each having a passage 72 for receiving cooling fluid. A plate 74 is positioned between the plates 57 and 59 and has slots for receiving the rails 69. The plate 74 is connected to the piston of the fluid cylinder 62 and is movable vertically in response to actuation of the cylinder 62 between the upper plate 57 and lower plate 59. The plate 74 supports a set of parallel spaced thin blades 75 for movement between extended positions (FIGS. 5-7) projecting downwardly through corresponding slots within the plate 59 and retracted positions (FIG. 8) where the bottom ends of the blades 75 are flush with the bottom surface of the plate 59.

During the twin-sheet thermoforming process, the heated upper sheet 18 is vacuum-formed into a cavity 78 within the plate 59 to provide the sheet with a smooth flat top surface 80 (FIGS. 1 & 4) surrounding by a peripherally extending vertical wall 82 (FIG. 6) which continues to form a peripherally extending and outwardly projecting horizontal lip or flange 84. The blades 75 extend downwardly during the vacuum forming operation so that the heated sheet 18 forms a double wall rib 90 (FIGS. 5 & 6) around each of the blades 75. After the upper sheet 18 and the lower sheet 20 have been vacuum-formed and are still hot and not solidified, the upper mold section 55 shifts downwardly and closes on the lower mold section 30 (FIG. 7) when the peripheral flanges 44 & 84 fuse together, the upper end portions of the open ribs 35 & 37 fuse to the top sheet 18, and the lower end portions of the double wall ribs 90 fuse to the lower sheet 35. Also, when the mold sections close, the top walls of the cavities 46 & 48 fuse to the upper sheet 18.

The blades 75 are then retracted upwardly (FIG. 8), and the hollow space between the sheets 18 and 20 and surrounding the parallel adjacent side walls of the ribs 90 is pressurized with air so that the adjacent side walls of each rib 90 are fused together, as shown in FIG. 8, to form the closed and fused double wall ribs 90 shown in FIGS. 2, 3, 4 & 8. As also shown in FIGS. 2 & 3, the closed double wall ribs 90 extend transversely or perpendicular to the open ribs 35, and the opposite end portions of the closed double wall ribs 90 are fused to the adjacent side walls of the open ribs 35. After the twin sheet panel 15 is formed by the twin-sheet thermoforming process, and the panel 15 is removed from the open mold sections 30 & 55, the flat top surface 80 of the upper panel 18 is smooth and solid without any cavities. The surface 80 has only linear marks or lines 95 where the blades 75 have been retracted (FIG. 8) to form the closed double wall ribs 90.

From the drawings in the above description, it is apparent that a hollow thermoformed plastic panel and a plastic pallet made from the panel, provide desirable features and advantages. As one important advantage, the arrangement of the downwardly projecting closed double wall ribs 90 within the vacuum-formed upper sheet 18 of the panel 15 and the crossing open ribs projecting upwardly from the vacuum-formed lower sheet 20 with the ribs fused to the opposing sheets, along with the fused peripheral flanges, provides the panel 15 with substantial strength in all directions while minimizing the weight of the panel. This feature is especially desirable when the panel 15 is used to form the upper deck of a plastic pallet as shown in FIG. 1. In addition, by forming the closed double wall ribs 90 within the vacuum-formed sheet 18, the top surface of the panel is essentially solid, which is especially desirable when the panel is used to form a plastic pallet. Also, by fusing the opposite ends of the double wall closed ribs 90 with the side walls of the vacuum-formed open ribs 35, the pattern of crossing connected ribs adds further to the strength of the hollow panel 15. In addition, by increasing the strength of the hollow panel 15 in all directions, the thickness of the sheets 18 and 20 may be reduced, with the result that the weight of the entire hollow panel 15 is reduced.

While the form of thermoformed panel herein described and its method of construction constitute a preferred embodiment of the invention, it is to be understood that the invention is not limited to this precise form of panel, and that changes may be made therein without departing from the scope and spirit of the invention as defined in the appended claims.

What is claimed is:

1. A hollow plastic deck panel adapted for use in a plastic pallet, said panel comprising
    a first sheet of plastics material and a second sheet of plastics material,
    said first sheet and said second sheet having corresponding peripheral edge portions fused together to space portions of said second sheet from said first sheet,
    said second sheet of said deck panel including a plurality of parallel spaced rows of aligned elongated double wall ribs extending across said second sheet and projecting upwardly with top portions of said ribs fused to said first sheet to reinforce said deck panel in a first direction,
    said first sheet of said deck panel including a plurality of parallel spaced rows of aligned elongated double wall ribs projecting downwardly between said ribs in said second sheet and having bottom portions of said ribs in said first sheet fused to said second sheet,
    said double wall ribs in said rows in said first sheet extending between and perpendicular to said parallel spaced ribs in said second sheet, and
    said elongated double wall ribs in said first sheet having opposite end portions intersecting and fused to center portions of said elongated double wall ribs in said second sheet to reinforce said deck panel in a second direction perpendicular to said first direction.

2. A deck panel as defined in claim 1 and forming an upper deck panel,
    a lower deck panel having a structure substantially the same as said upper deck panel and spaced below said upper deck panel and inverted with respect to said upper deck panel
    said first sheet and said second sheet of said upper deck panel and of said lower deck panel having peripherally spaced annular ribs defining peripherally spaced vertically aligned cavities, and
    a set of hollow plastic legs projecting into said aligned cavities and connecting said upper deck panel and said lower deck panel to form a plastic pallet.

3. The plastic pallet defined in claim 2 wherein said elongated double wall ribs in said first sheet of each of said upper deck panel and said lower deck panel comprise closed double wall ribs to provide a substantially solid top surface for said upper deck panel and a substantially solid bottom surface for said lower deck panel.

* * * * *